United States Patent
Asturias (10) Patent No.: US 11,494,207 B2
(45) Date of Patent: Nov. 8, 2022

(54) COMMAND LINE INTERFACE EXTENSION PROCESS

(71) Applicant: Arista Networks, Inc., Santa Clara, CA (US)

(72) Inventor: Diego Alfredo Asturias, Mountain View, CA (US)

(73) Assignee: ARISTA NETWORKS, INC., Santa Clara, CA (US)

( * ) Notice: Subject to any disclaimer, the term of this patent is extended or adjusted under 35 U.S.C. 154(b) by 0 days.

(21) Appl. No.: 17/336,552

(22) Filed: Jun. 2, 2021

(65) Prior Publication Data

US 2022/0164206 A1    May 26, 2022

Related U.S. Application Data

(60) Provisional application No. 63/117,038, filed on Nov. 23, 2020.

(51) Int. Cl.
| | |
|---|---|
| *G06F 9/44* | (2018.01) |
| *G06F 9/455* | (2018.01) |
| *G06F 8/41* | (2018.01) |
| *G06F 9/445* | (2018.01) |

(52) U.S. Cl.
CPC .......... *G06F 9/45512* (2013.01); *G06F 8/427* (2013.01); *G06F 9/44505* (2013.01); *G06F 9/45529* (2013.01)

(58) Field of Classification Search
None
See application file for complete search history.

(56) References Cited

U.S. PATENT DOCUMENTS

| | | | |
|---|---|---|---|
| 9,588,947 B1* | 3/2017 | Kraiser | G06F 8/30 |
| 2004/0040016 A1* | 2/2004 | Pearce | G06F 8/30 |
| | | | 717/141 |
| 2008/0209316 A1* | 8/2008 | Zandstra | G06F 8/00 |
| | | | 715/700 |
| 2018/0322136 A1* | 11/2018 | Carpentier | G06F 9/452 |
| 2020/0142714 A1* | 5/2020 | Navarro | G06F 9/44526 |
| 2020/0351367 A1* | 11/2020 | Eberlein | G06F 9/547 |

* cited by examiner

*Primary Examiner* — Insun Kang
(74) *Attorney, Agent, or Firm* — Fountainhead Law Group P.C.

(57) ABSTRACT

In some embodiments, a method or processing a command line interface is provided. The method parses a definition file for extending a command line interface (CLI) with an extension. The definition file is processed through an external interface that is different from an internal interface used to develop the CLI. The method translates a definition from the definition file to an internal structure supported by the internal interface. The translated definition implements the extension in the CLI. The internal structure is added to a data structure for the CLI where a command set of the CLI is extended to perform a command that is defined by the definition.

19 Claims, 12 Drawing Sheets

```
                                                              302
vendor:
   name: ABC Corp.
   address: 100 Main Street, Santa Clara, CA 95054
   phoneNumber: +1-555-444-3333
   email: support-staff@abc-corp.com
```

FIG. 4

```
              502              504
                                                              304
daemons:
   TestDaemon1:
      exe: /usr/bin/TestDaemon1.py
      heartbeatPeriod: 60
      argv: --startup
      oomScore: 100
```

```
schemas:
 - &showSchema1 show1 : { <jsonSchema> }
 - &showSchema2 show2 : { <jsonSchema> }
 - &showSchema3 show3 : { <jsonSchema> }
modes:
  modeName:
    command:
      syntax: string # required
      noSyntax: string # optional
      modeKey: string # required
      daemon: string # optional
    commands:
      show1:
        syntax: string # required
        mode: string|list # required
        hidden: boolean # optional
        outputSchema: json # optional
        data: # optional
          tokenName:
            MatcherType:
              matcherArgs:
                ... # see Matcher types for more information
      show2:
        ...
      show3:
        ...
      config1:
        syntax: # see above
        noSyntax: # optional the noOrDefaultSyntax (only allowed in config mode)
        defaultSyntax: # optional, If no != default
        mode: # see above
        data: # see above
      exec1:
        syntax: # see above
        mode: # see above
        data: # see above
```

Definition file 116

FIG. 8

```
class ShowHouseTemperature( CliExtension.ShowCommandClass ):
    def handler( self, ctx ):
        daemon = ctx.getDaemon( 'ThermostatDaemon' )
        if daemon is None:
            ctx.addError( 'Unable to get daemon info' )
            return None return {
            'thermostat': daemon.config.config( 'desiredTemp' ),
            'currentTemp': daemon.status.status( 'currentTemp' )
        } def render( self, data ):
        print( 'Thermostat set to', data[ 'thermostat' ], 'f' )
        print( 'Current house temp is', data[ 'currentTemp' ], 'f' )

class SetThermostatCmd( CliExtension.CliCommandClass ):
    def handler( self, ctx ):
        ctx.daemon.config.configSet( 'desiredTemp', ctx.args[ '<temp>' ] )

def noHandler( self, ctx ):
        ctx.daemon.config.configSet( 'desiredTemp', 68 )

class ResetThermostatCmd( CliExtension.CliCommandClass ):
    def handler( self, ctx ):
        # reset house thermostat
        pass def plugin( ctx ):
    CliExtension.registerCommand( 'ConfigThermo', SetThermostatCmd )
    CliExtension.registerCommand( 'resetThermo', ResetThermostatCmd )
    CliExtension.registerCommand( 'ShowHouseTemperature', ShowHouseTempCmd )
```

FIG. 9

```
vendor:
   name: Arista Networks
   address: 5453 Great America Parkway, Santa Clara, CA 95054
   phone number: +1-555-444-3333
   email:   support-staff@arista.com
schemas:
   - &showHouseTempSchema showHouseTemp: {
   "$schema": "http://json-schema.org/draft-07/schema#",
   "title": "Version",
   "description": "House Temperature Information",
   "type": "object",
   "properties": {
      "thermostatTemp": {
         "description": "Desired temperature of the house",
         "type": "number"
      },
      "currentTemp": {
         "description": "Current temperature of the house",
         "type": "number"
      },
   },
   "additionalProperties": false,
   "required": [ "thermostatTemp", "currentTemp" ]
}
                                        1002
daemons:
   ThermostatDaemon:
      exe: /usr/bin/Thermostat.py
                                                         1005
modes:
                                         1004
   thermostatMode:
      command:
         syntax: management thermostat
                                                  1006
         noSyntax: management thermostat
      modeKey: mgmt-thermo
      daemon: ThermostatDaemon
```

FIG. 10A

```
# Define all our CLI commands
commands:
   showHouseTemp:
      syntax: show house temperature
      mode: Privileged
      outputSchema: *showHouseTempSchema
   configThermo:
      syntax: thermostat <temp>
      noSyntax: no thermostat ...
      mode: thermostatMode
      data:
         <temp>:
            integer:
               low: 32
               high: 212
               Help: this is great but a jacket is better
   resetThermo:
      syntax: reset house thermostat
      mode: Privileged
      hidden: true
```

1008 {  (brace encompassing the code block above)

COMMAND LINE INTERFACE EXTENSION PROCESS

CROSS REFERENCE TO RELATED APPLICATIONS

Pursuant to 35 U.S.C. § 119(e), this application is entitled to and claims the benefit of the filing date of U.S. Provisional App. No. 63/117,038 filed Nov. 23, 2020, the content of which is incorporated herein by reference in its entirety for all purposes.

BACKGROUND

Many network devices provide a command line interface (CLI) that allows users to configure, manage, and monitor the network device via text commands. In a typical CLI user workflow, a user operates in a given "mode", which allows the user to access some aspect of network device functionality. For example, in "switch" mode, the user may have access to switch-level functionality. When the user is in "port" mode the user may have access to the ports, and so on. When the user initiates a CLI session, the user is placed in a default "mode." For example, if the switch mode is entered, the device presents the user with a command prompt such as "switch>" to indicate the mode they are in. Text from the user is received at the command prompt that corresponds to a CLI command that is available to the user in "switch" mode. The CLI then parses the entered text and determines whether it matches a valid command that is understood by the CLI. If so, the CLI executes the matched command and presents an execution result, if appropriate, to the user.

The CLI is generally developed by internal developers from the company that developed the network device. The developers use an internal definition and internal interface to the company to develop the CLI data structure. However, in some cases, an extension to the existing CLI may be desired, such as a third party different from the company may want to add their own CLI commands. The third party may have no options to extend the CLI; for example, the tools for developing the CLI may be strictly internal to the developer. However, even if an option exists to allow the third party to extend the CLI, the company may not want to expose the internal interface to use the internal definition, and whatever option that is available may be limited in the functionality that is provided.

BRIEF DESCRIPTION OF THE DRAWINGS

With respect to the discussion to follow and to the drawings, it is stressed that the particulars shown represent examples for purposes of illustrative discussion, and are presented to provide a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings.

DETAILED DESCRIPTION

Described herein are techniques for a computing system. In the following description, for purposes of explanation, numerous examples and specific details are set forth to provide a thorough understanding of some embodiments. Some embodiments as defined by the claims may include some or all the features in these examples alone or in combination with other features described below, and may further include modifications and equivalents of the features and concepts described herein.

Some embodiments allow extensions to a CLI in a network device. The network device may receive a definition file that defines the extension. For example, the definition file may be received from a third party that wants to extend the command set of the network device. Processing of the definition file allows the third party to extend an already configured CLI according to specific requirements. The extension to the CLI may use a different external interface than that used by an internal developer of the already developed CLI.

The format used by the definition file may be separate from the internal format used by the developers to separate any reliance on the internal format. For example, the developers can change the internal format without worrying that third parties may be affected by the changes. The contents of the definition file may be defined based on the features for configuring the CLI offered by the internal interface. That is, a company may choose to expose any number of features from the internal interface for extending the CLI. This allows the company to control what can be extended in the CLI and how the CLI can be extended. The content of the CLI may be defined such that a third party can clearly and easily extend the CLI separately from the internal interface, which may be confusing to an external user that has not developed the CLI for the network. The definition file may be expressed in a language, such as YAML (recursively defined as YAML Ain't Markup Language), JavaScript Object Notation (JSON), etc. The definition file can include information for the following entities; however, other information may be included:
- Vendor
- Daemons
- Modes
- Commands An agent may be used to process the extension to the CLI. For example, the agent may read the vendor information, which serves to identify the source of the CLI extension. Then, the agent may read the daemons and validate that the data to run the daemon is correct. The agent reads and validates the modes, which may create a mode in the CLI data structure and the command to enter the mode. The mode may be a container that may contain CLI commands and other data for the mode. Running of the daemon may be tied to the configuration controlled by the mode. Also, if the definition file has defined a running configuration generator, the agent adds it to the mode. Next, the agent reads and validates the commands from the definition. The agent may dynamically generate a CLI parse tree for each command, which is then used to interpret and process a command that has been entered in the CLI. Each of the parse trees are added into their appropriate modes. At this point, the agent has translated the definition file into a format compatible with the CLI data structure to extend the CLI. During runtime, the mode may be entered and commands may be executed.

Accordingly, the agent provides a process for a user to extend an already existing CLI using the definition file. The agent allows a third party to use the definition file to extend the CLI without requiring access to proprietary internal development tools that are available to a developer of the network device.

Overview

Figure 1:
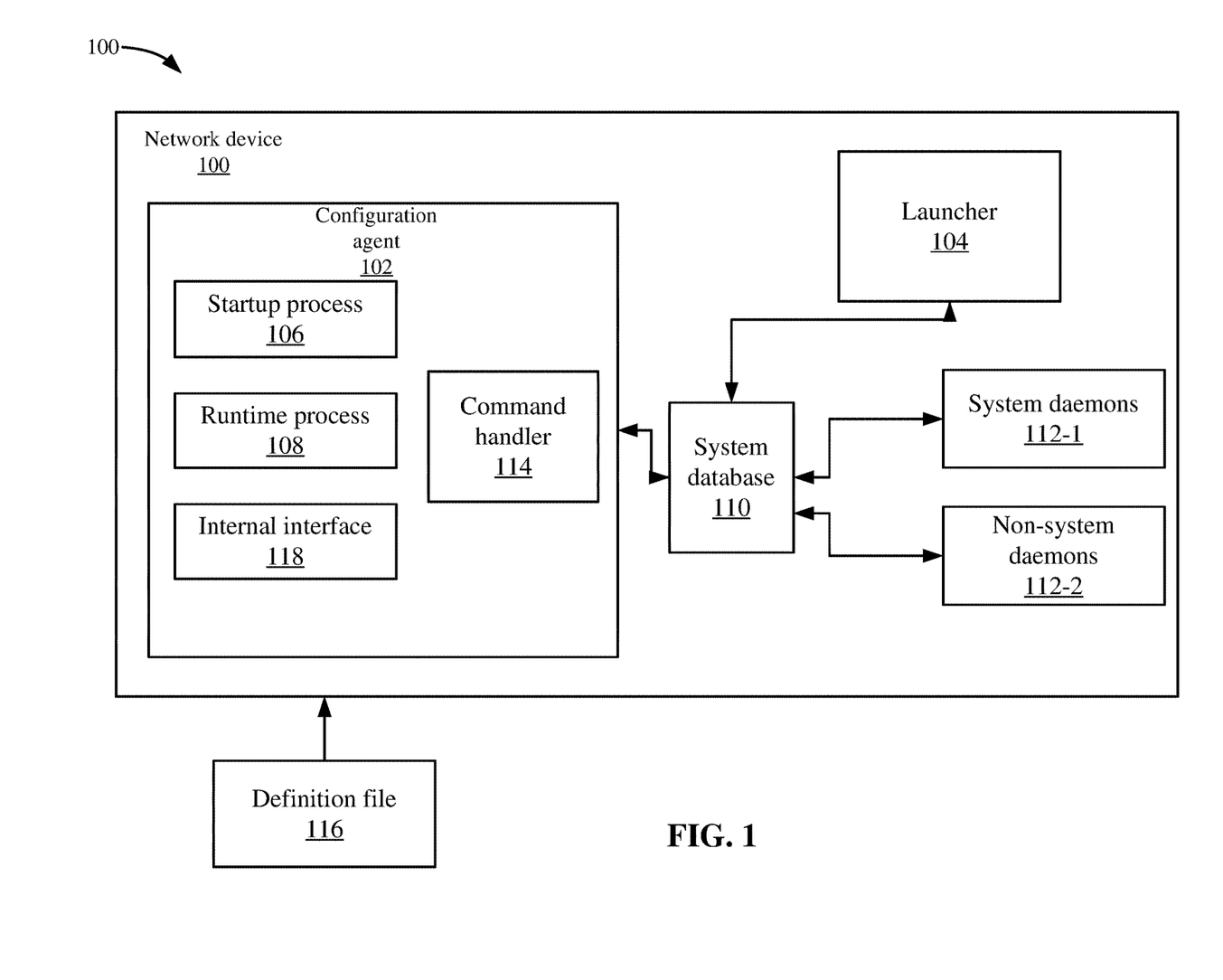
FIG. 1 depicts a simplified example of a network device according to some embodiments.

FIG. 1 depicts a simplified example of a network device 100 according to some embodiments. Network device 100 may implement a Command Line Interface (CLI) that may include the entities depicted in network device 100. Network device 100 may include a network switch or network router; however, the CLI may be implemented using another type of computing system or device in which a CLI is used.

A CLI may be first developed using an internal interface 118 of a configuration agent 102. A CLI data structure may store data to implement the CLI and may follow an internal structure that is internally developed by the developers of a company associated with network device 100 (e.g., an initial seller) using an internal definition. Internal interface 118 may not be accessible to third parties outside of the company. However, a startup process 106 of configuration agent 102 may have an external interface that may be used to extend the CLI data structure with additional CLI modes and commands. Additionally, a runtime process 108 of configuration agent 102 may receive CLI commands and execute the respective commands including commands that were internally developed and also commands that were added to the CLI by the third party.

Network device 110 may include the CLI, which may include a configuration agent 102, launcher 104, a system database 110, system daemons 112-1, and non-system daemons 112-2, but not all the entities are required. System database 110 may maintain information that can be queried using the CLI, such as device state for network device 100. For example, system database 110 may store the operating state of network device 100, such as port status, port configuration, routing information, etc. Configuration agent 102 and daemons 112 may interact with system database 110. For example, if a command received from a user wants to set a port state or read a port state, system daemon 112 may write the state information to system database 110 or read state information from system database 110. When a user wants to retrieve the port state, system daemon 112 can obtain the port state by reading the information from system database 110. Launcher 104 can control whether or not a daemon 112 is run. A system daemon 112-1 may be associated with network device 102 and a non-system daemon 112-2 may be a daemon that is installed by a third party.

Command handler 114 may be a process that may execute the command and may be designated as a handler for commands that are defined in a mode. Command handler 114 may be a function that specifies the logic to be executed by the CLI when the CLI command is matched to an input text string received by CLI. Command handler 114 can be defined within definition file 116 itself or can be defined in a separate location/file that is referenced by definition file 116. The latter approach may be useful in reducing code duplication experienced when multiple CLI commands may share the same command handler logic.

Modes may be different user interface states of the CLI that enable the user to perform different types of operations, such as configuration management tasks. Different examples of modes may include an "exec mode" for displaying system information, performing basic tasks, connecting to remote devices, and changing terminal settings; a "privileged exec" mode for configuring operational and global parameters; "interface configuration" mode for configuring or enabling Ethernet, virtual local area network (VLAN), and port-channel features; and a "protocol-specific" mode for modifying certain network protocol settings. When a CLI command mode is entered during runtime, commands may be submitted by a user that are associated with that mode and commands that are not associated with that mode may not be submitted and executed. Accordingly, the commands associated with a mode may only be executed when entered into that mode.

A definition file 116 may include the definition for the CLI extension. Definition file 116 may be a data object that is represented in a language. The language may be in a format that is defined for a third party to use to extend the CLI data structure. One difference between definition file 116 and the internal definition used to develop the CLI using internal interface 118 is that definition file 116 is received from a third party outside of the developers of network device 100. Also, the structure of definition file 116 may be different from the internal definition that is used by the developer of network device 112 to develop the CLI. For example, the functionality that can be expressed in definition file 116 is limited to extending the CLI with only certain features. Further, definition file 116 may be not compatible with internal interface 118. Rather, startup process 106 provides an external interface to read definition file 116 and translate the definition to an internal format to extend the CLI. By separating the extension of the CLI from the development of the CLI, the developer of network device 100 may not have to worry about any changes to internal interface 118 affecting the ability of a third party to extend the CLI and the company may limit the features that are exposed for extending the CLI. Further, the language used in the definition file 116 may be designed for the extension of the CLI and be easier for the third party to use than using the internal format. The separation of internal interface 118 and the external interface of startup process 106 allows a separate language to be used to generate definition file 116. Then, startup processes 106 may implement a translation layer to translate definition file 116 into an extension of the CLI data structure.

The following will describe the configuration process for extending the CLI and then the execution of the CLI command according to some embodiments.

CLI Extension Process

Figure 2:
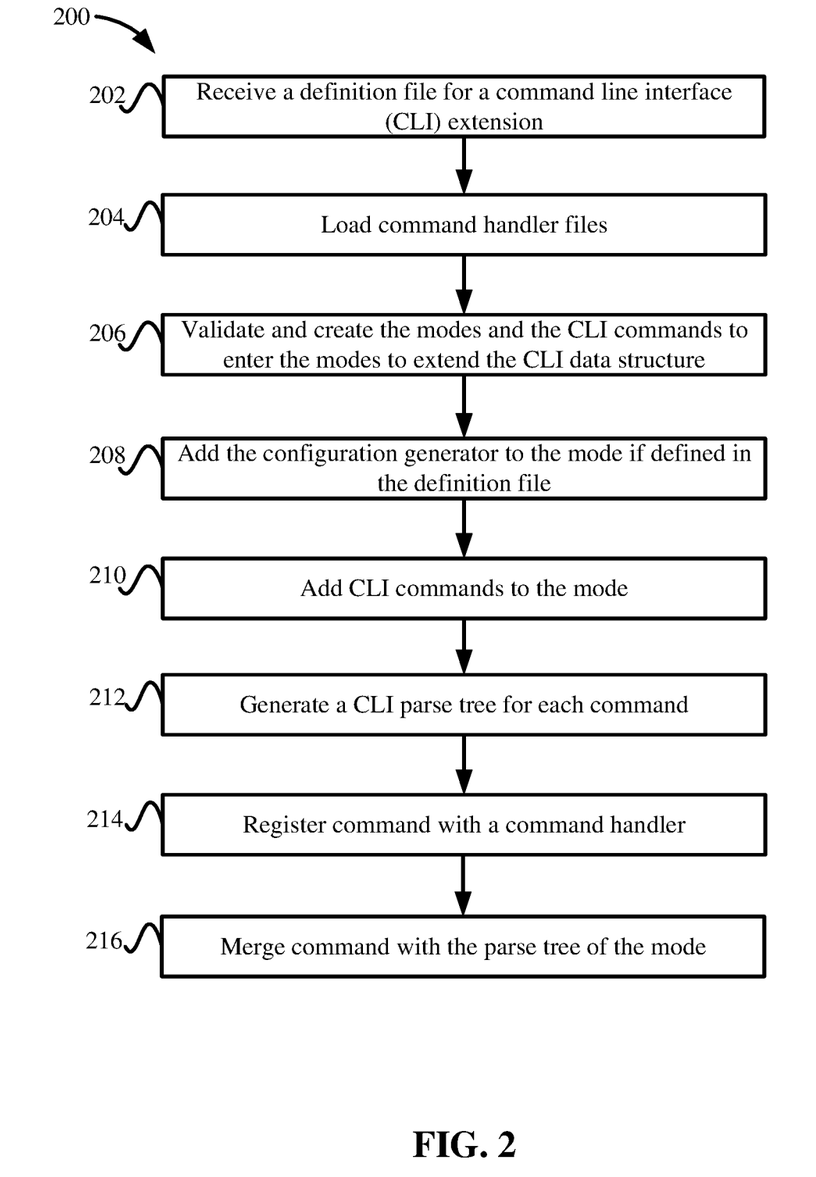
FIG. 2 depicts a simplified flowchart of a method for extending the CLI according to some embodiments.
Figure 3:
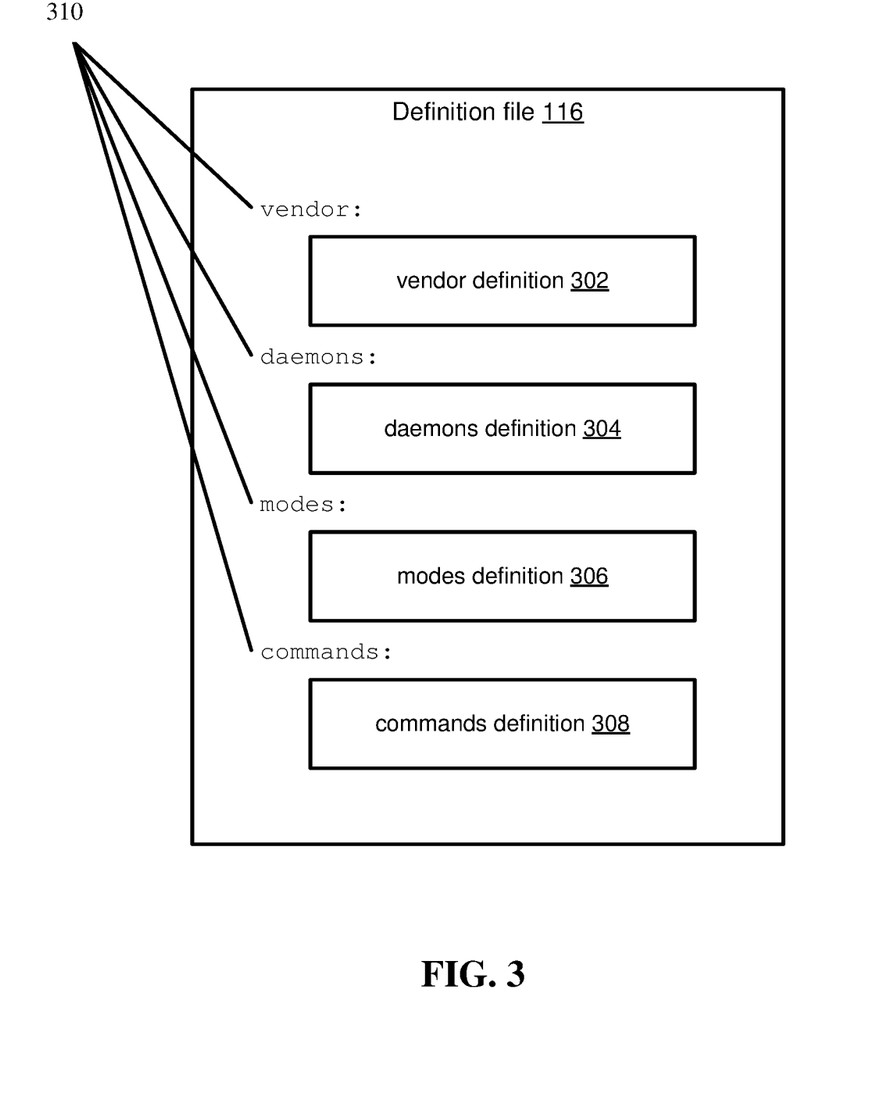
FIG. 3 depicts an example of a definition file according to some embodiments.

FIG. 2 depicts a simplified flowchart 200 of a method for extending the CLI according to some embodiments. At 202, configuration agent 102 receives a definition file 116 that defines a CLI extension. FIG. 3 depicts an example of definition file 116 according to some embodiments. Definition file 116 includes a vendor definition 302, a daemons definition 304, a modes definition 306, and a commands definition 308. Definition file 116 may include tags 310 that may distinguish the different definitions in definition file 116. These entities may be defined in definition file 116 because they may be applicable to generating an extension to the CLI.

Figure 4:
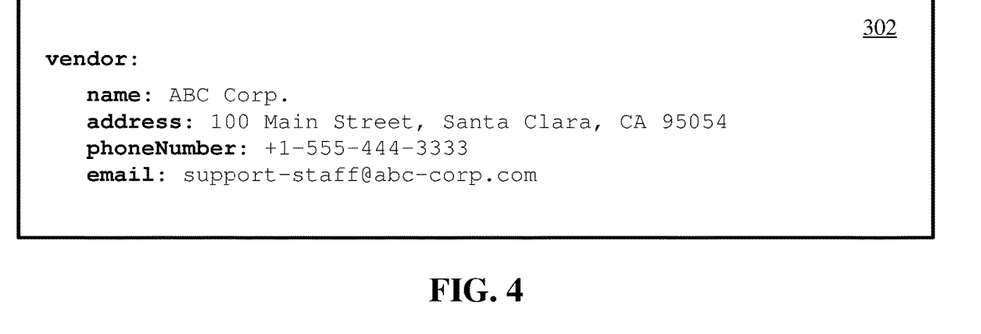
FIG. 4 depicts an example of a vendor definition according to some embodiments.

Vendor definition 302 allows for documentation and understanding where the extension is from. Because the extension is from a third party, the vendor information may be needed for some situations, such as to debug the extension. For example, the vendor section assists in figuring who can be reached if there is an issue with the extension. Internally developed CLI commands may not need to be identified with vendor information. The vendor section can include the name of the vendor, contact information, and other information. FIG. 4 depicts an example of a vendor definition 302 according to some embodiments. The vendor information may include a name, address, phone number, and email to identify the third party that extended the CLI. Other information may also be appreciated.

Figure 5:
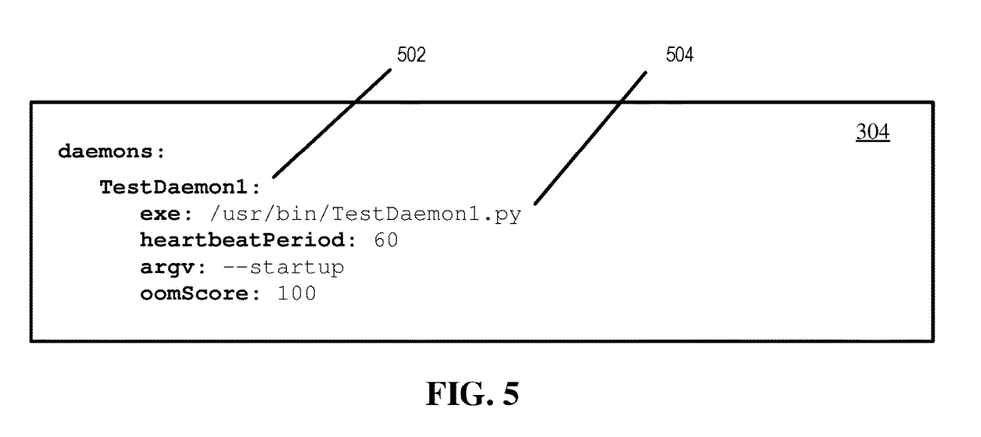
FIG. 5 depicts an example of a daemons definition according to some embodiments.

Daemons definition 304 allows a third party to define their own processes (sometimes referred to as "daemons") that execute in the background of network device 100. The code for a daemon can be compiled code (e.g., C, C++, etc.) or interpreted code (e.g., Python, JavaScript, etc.). A daemon may be used to execute a CLI command and definition file 116 allows the third party to define the daemons. FIG. 5 depicts an example of daemons definition 304 according to some embodiments. At 502, a name of the daemon is provided. Also, at 504, a path name of the file that contains the software code for the daemon is provided. Other information may also be provided for the daemon, including a heartbeat period that defines the amount of time in which to send and receive heartbeats, arguments (e.g., argv), and out of memory (OOM) scores.

Figure 6:
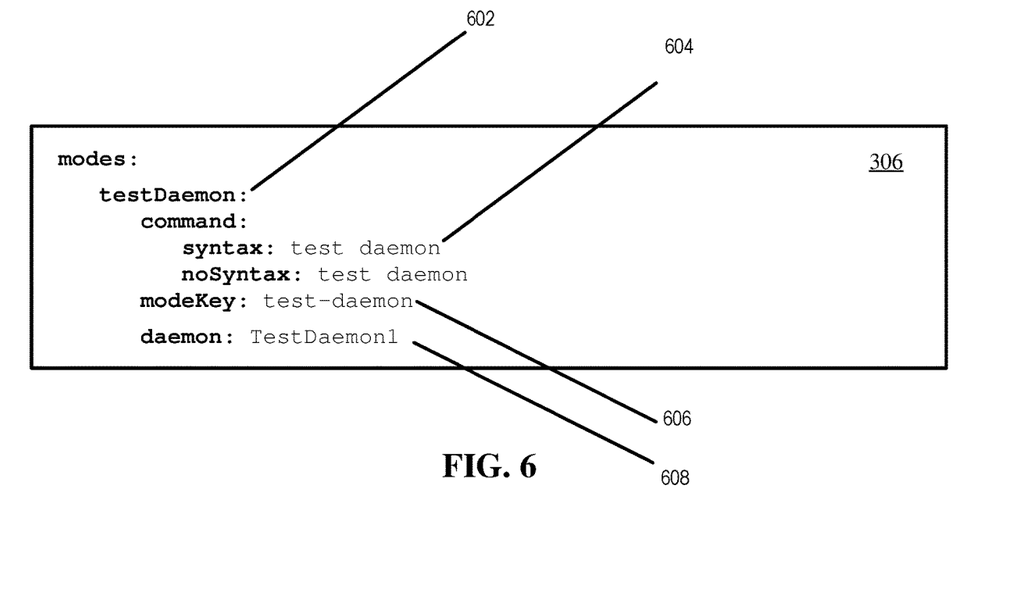
FIG. 6 depicts an example of a modes definition according to some embodiments.

Modes definition 306 defines the commands for the mode for their commands, and may include nesting of modes. For example, a mode may be defined for configuring the ports on the network device, another mode may be defined for managing routing tables, and so on. A mode can be associated with a daemon and can be tied to the configuration of the associated daemon, and can have additional configurations. FIG. 6 depicts an example of a modes definition 306 according to some embodiments. At 602, a name of the mode is defined as "testDaemon". Also, the mode defines the CLI command for entering a mode. For example, at 604, the syntax, which may be expressed in an extended Backus-Naur form (EBNF) grammar that is modified by additional data, for the command to enter the mode is "test daemon". That is, a command "test daemon" from the CLI may be received (e.g., a user may type in "test daemon") to enter into this mode. The syntax string of the CLI command defines a syntax structure of the CLI command. For example, the syntax structure may define how the command syntax elements (e.g., command keywords, input parameters, etc.) may be combined in sequence to produce valid instances of the command that are understood by the CLI. The modekey 606 identifies the mode that the user is in. Also, at 608, the name of the daemon that is associated with this mode is defined as "TestDaemon1", which is the name of the daemon that is being executed in the CLI for this mode.

Figure 7:
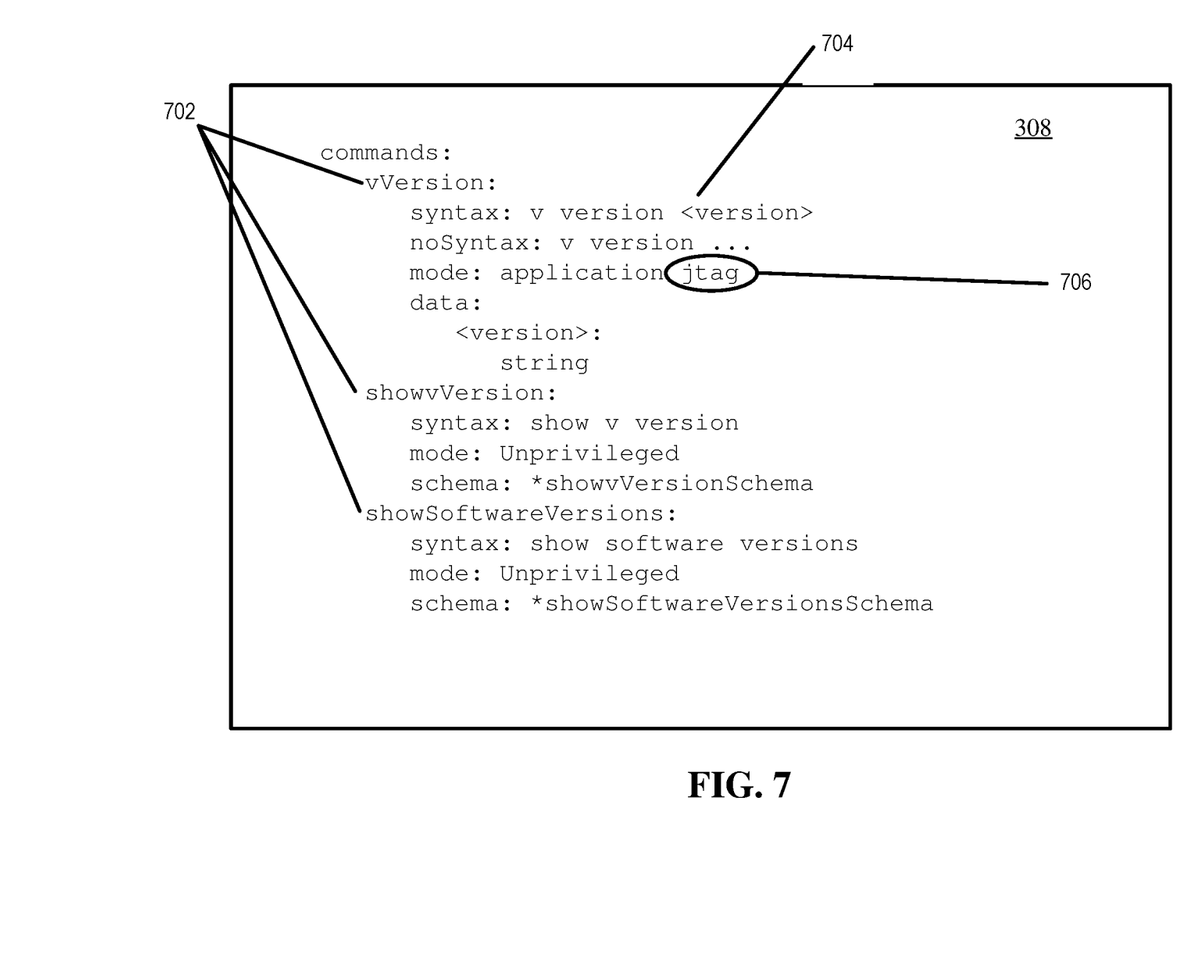
FIG. 7 depicts an example of commands definition according to some embodiments.

Commands definition 308 defines the new commands for the mode. FIG. 7 depicts an example of commands definition 308 according to some embodiments. At 702, labels that identify the commands for the mode are shown as "vVersion", "show vVersion", and "showSoftwareVersions". Each command may have a syntax, such as at 704, the syntax for the vVersion command may be "v version <version>". This syntax for the command should be received at the CLI to invoke the vVersion command. Also, the commands show the mode in which the command is associated. That is, the mode should be entered and then the command can be executed. At 706, for the vVersion command, the command is available when the "jtag" mode is entered. A mode may have multiple commands that are associated with it.

Figure 8:
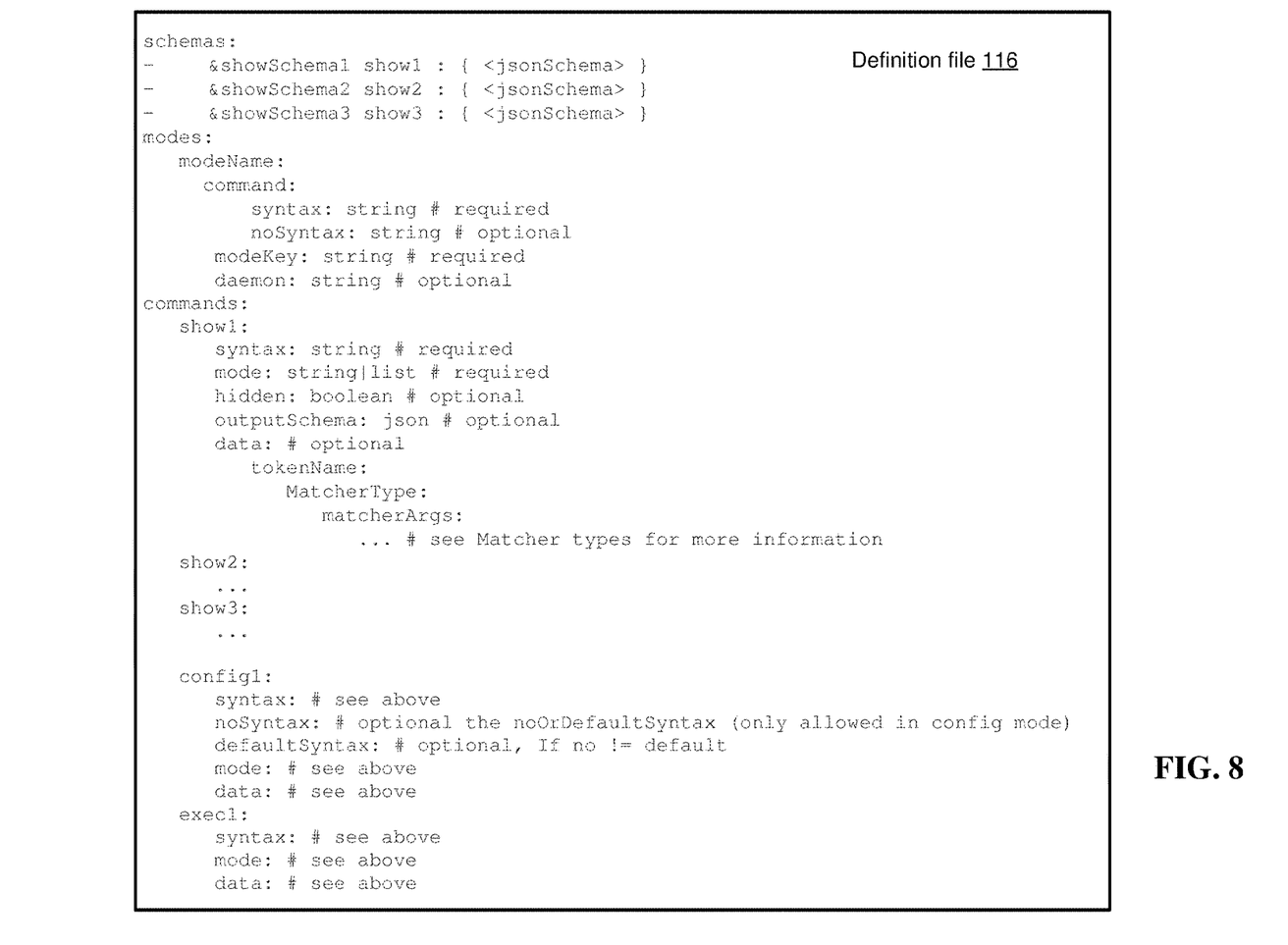
FIG. 8 shows an example of the definition file according to some embodiments.

FIG. 8 shows an example of definition file 116 according to some embodiments. Definition file 116 shows the general format that can be used and includes the modes and commands section described above. In some embodiments, definition file 116 is separate from the command handler, which includes command logic to execute the command. This makes the command execution logic separate from the command definition file, which makes the definition file 116 language agnostic because definition file 116 does not need to use the language used by the command handler. Separation of definition file 116 from the command handler is useful in the extension scenario because the language used in definition file 116 may be different from that used by internal developers.

Referring back to FIG. 2, the processing of definition file 116 will now be described. At 204, startup process 106 loads command handler files for command handlers 114 into memory. Command handlers 114 may or may not be written by the third party. A mapping between a command label and a command handler 114 may be stored to associate the command that will use this command handler 114. For example, the command label may identify the command for a command handler 114.

At 206, startup process 106 validates and creates the modes and the CLI commands to enter the modes. For example, start-up agent 106 may read the modes that are defined in modes definition 306. The commands that are defined, such as at 604 in FIG. 6, to enter the modes are also validated and created. A validation may include determining whether the syntax of the mode has already been included in the CLI and validating that the syntax is correct. Also, the validation may determine whether the CLI command to enter the mode has already been established in the CLI. This step is performed for an extension to make sure the extension does not conflict with existing CLI modes. Additionally, start-up agent 106 may install any defined daemons 112 from the mode in network device 100 for execution.

At 208, start-up agent 106 adds a configuration generator to the mode as defined in definition file 116. The configuration generator may allow the third party to run their own configuration generator that may generate a configuration store in system database 110.

At 210, start-up agent 106 adds CLI commands to the mode. For example, the commands that are defined at 702 in FIG. 7, are added to the mode. Also, at 212, start-up agent 106 generates a CLI parse tree for each command. A command definition defines the structures and properties of CLI commands that are understood by the CLI. Each command definition may include a syntax string comprising one or more syntax elements, which may be command keywords, input parameters, etc. where the syntax string expresses a grammar for producing valid instances of a CLI command. In other words, valid combinations are similar to sequence elements that form the CLI command. A data structure for each syntax element may include semantic information indicating how the syntax element can be matched to a token in the input text string. Start-up agent 106 may translate each command definition into a parse tree that includes the CLI command syntax string/grammar and the semantic information for each syntax element. Accordingly, the parse tree is used to determine which command is entered into the CLI. To extend the CLI, start-up agent 106 may incorporate the new parse trees into the existing CLI parse tree data structure to become part of the CLI. This adds the new parse trees to existing parse trees that were developed using internal interface 118.

Figure 9:
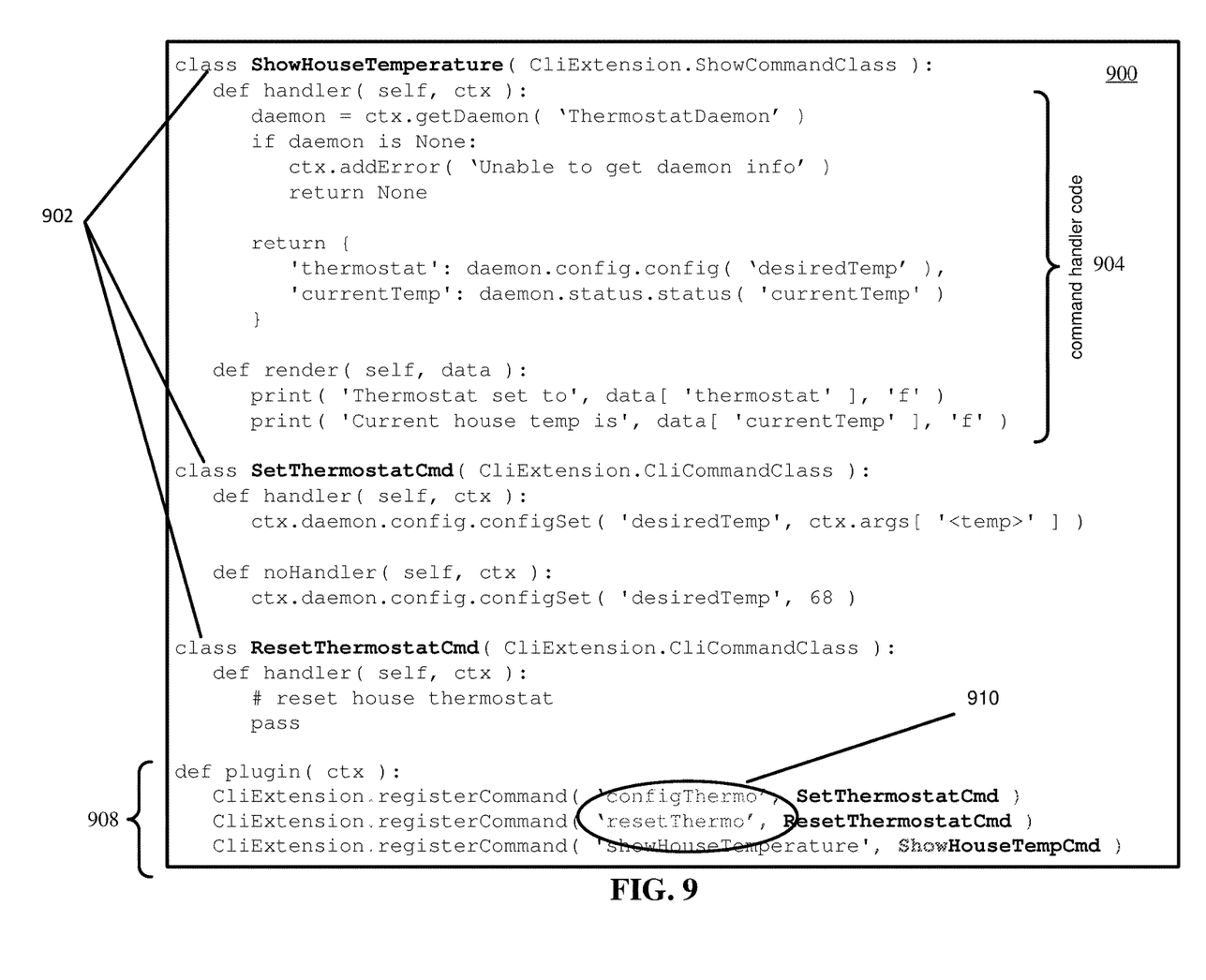
FIG. 9 shows an example of a command handler file according to some embodiments.

At 214, start-up agent 106 registers the command with a command handler 114. Command handler 114 may be invoked when a CLI command is executed to thereby execute the command. FIG. 9 shows an example of a command handler file 900 according to some embodiments. At 902, command handler file 900 may define command handlers that are invoked when respective commands from the extension are executed. For example, the command handlers of "ShowHouseTemperature", "SetThermostatCmd", and "ResetThermostatCmd" define command handlers 114 that can be invoked. Each command handler 114 may include command handler code that may be executed when the command handler is invoked from the execution of a command.

Command handler file 900 also associates command handlers 114 with a respective command. For example, at 908, a section that associates command handlers 114 defined in command handler file 900 with commands found in definition file 116 is shown. The commands that were defined in definition file 116 are shown at 910. For example, the command "configThermo" from definition file 116 is associated with the command handler "SetThermostatCmd", the command "resetThermo" from definition file 116 is associated with the command handler "ResetThermostatCmd", and the command "ShowHouseTemperature" from definition file 116 is associated with the command handler "ShowHouseTemperature". This provides a way for a third party to associate commands that are extending the CLI with command handlers 114.

Figure 10A:
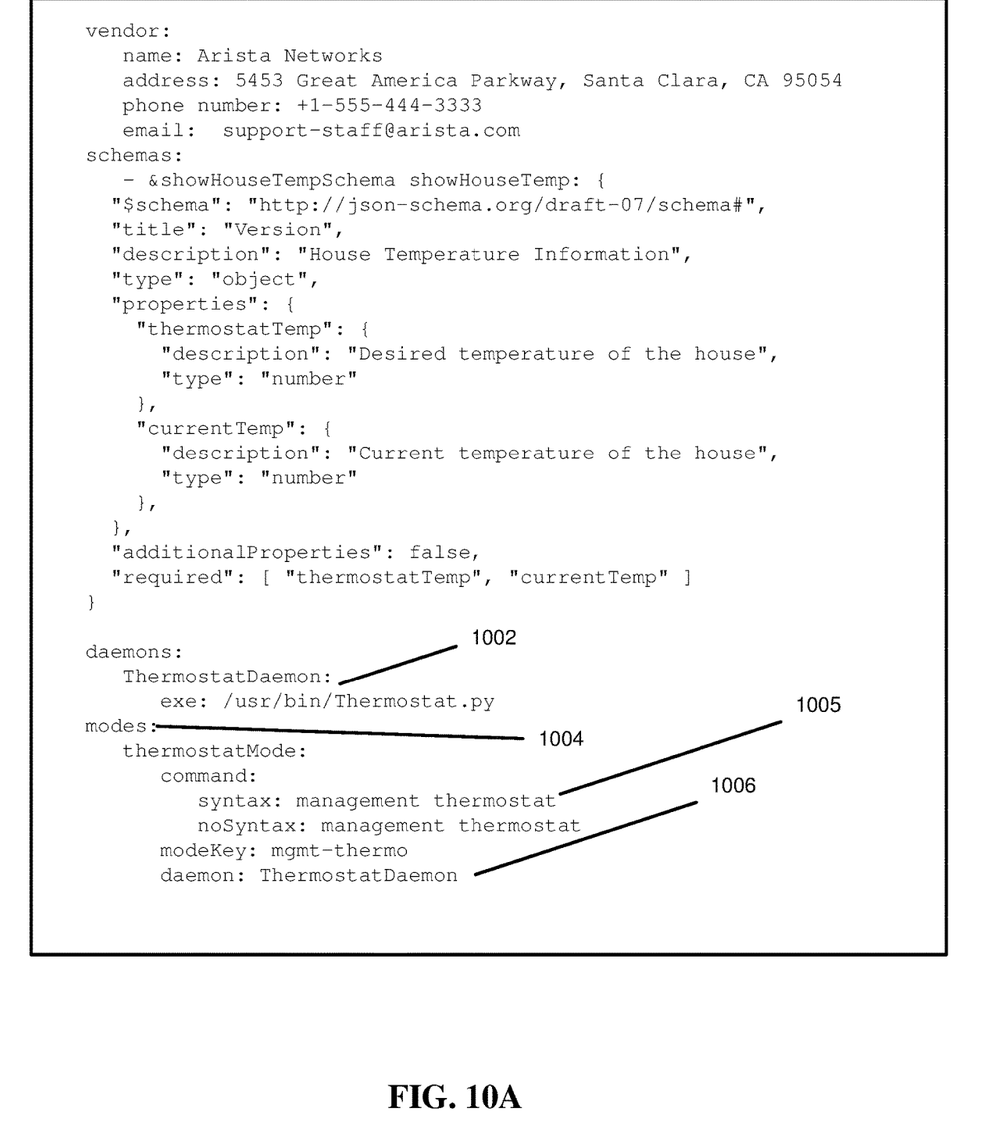
FIGS. 10A and 10B depict an example of the definition file according to some embodiments.
Figure 10B:
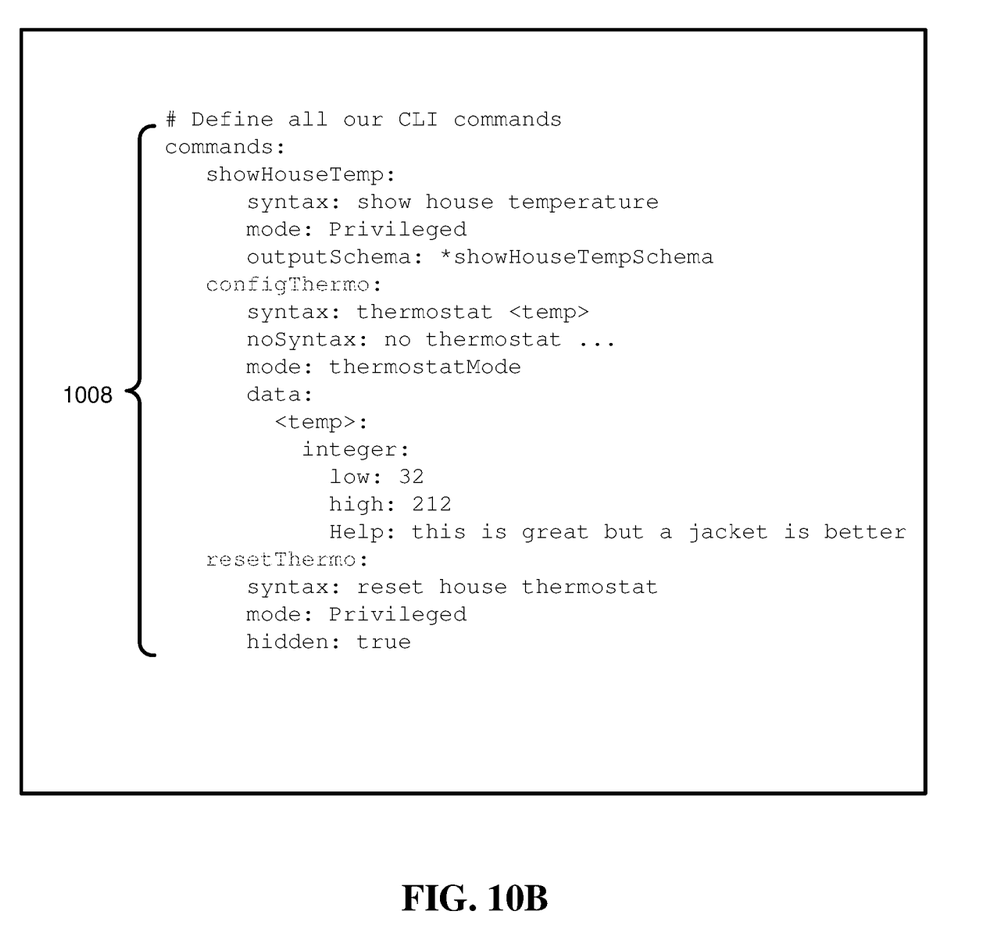

FIGS. 10A and 10B depict an example of a definition file 116 according to some embodiments. Definition file 116 is split between FIGS. 10A and 10B, but may be a contiguous file. Definition file 116 includes definitions for the vendors, modes, daemons, and commands in FIG. 10A. At 1002, definition file 116 defines the daemon as "ThermostatDaemon". Also, at 1004, the mode is "thermostatMode" and the command to enter the mode is "management thermostat" at 1005. The mode is also associated with the daemon at 1006. FIG. 10B shows the commands that are part of the extension according to some embodiments. At 1008, the commands "showHouseTemp", "configThermo", and "resetThermo" are defined.

Upon performing the above operations, startup process 108 has extended the CLI data structure with the defined modes, CLI commands, and command handlers 114. The format of definition file 116 is designed to allow a third party to extend the CLI separate from internal interface 118. The contents of definition file 116 are translated into a format compatible with the CLI data structure. After extending the CLI, the CLI may then receive commands for the extension.

Command Execution

Figure 11:
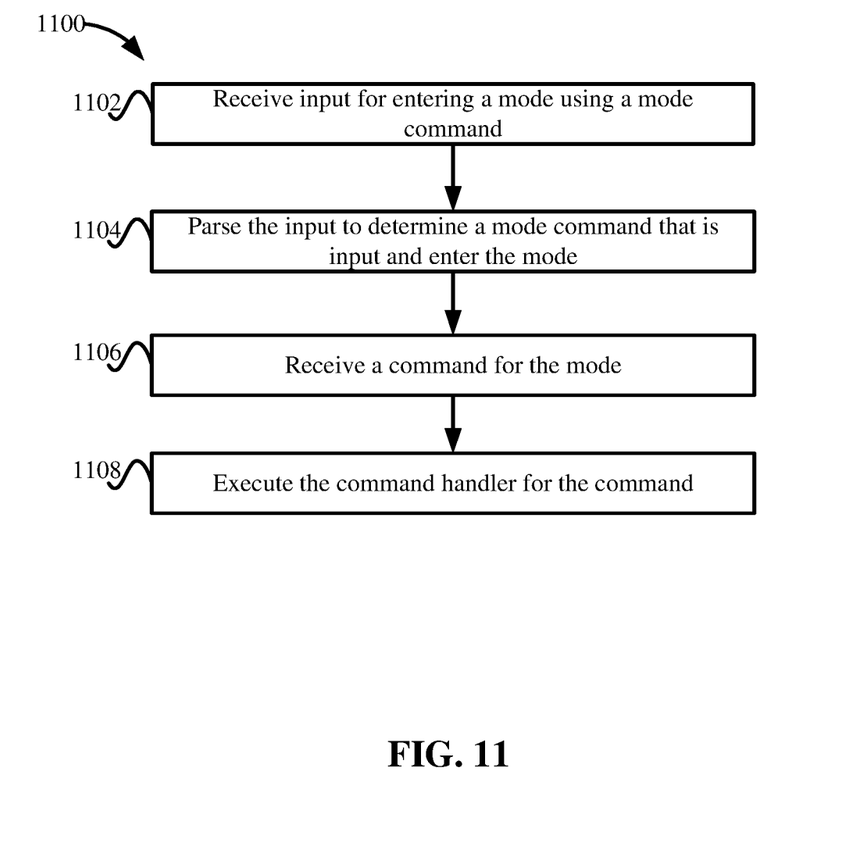
FIG. 11 depicts a simplified flowchart of a method for executing a command from an extension according to some embodiments.

FIG. 11 depicts a simplified flowchart 1100 of a method for executing a command from an extension according to some embodiments. At 1102, command handler 114 receives input (e.g., a mode command) from a user to enter a mode. For example, the mode command can be a keyword, such as "ports" to enter the mode for setting port parameters on a network device. At 1104, command handler 114 determines that the user entered a mode command, and in response the command handler enters the mode specified by or otherwise associated with the mode command. Command handler 114, for example, may use the syntax for the mode command that was generated from the extension to identify the mode to enter on the CLI.

Once entering the mode, at 1106, runtime process 108 receives a command to be executed within the mode. Runtime process 108 may use the parse tree that was generated from the extension to identify the command that is entered on the CLI. For example, runtime process 108 receives an input text string from a user or other source during runtime of the CLI. Start runtime process 108 processes the input text string by parsing a parse tree associated with the mode that has been entered. If a match between the input text string and a particular CLI command is determined, runtime process 108 can determine a command handler 114 associated with the matched CLI command. Then, at 1108, runtime process 108 invokes the command handler 114 to execute the command. For example, the command handler 114 that was defined by the extension for the command in command handler file 900 is invoked.

The invoked command handler 114 may then perform the command that is specified. Depending on the command, command handler 114 may read state information from system database 110. Also, command handler 114 may write information to system database 110. Also, in other embodiments, command handler 114 may interact indirectly with daemons 112 to read state information generated by the daemons. For example, if the port status is requested, command handler 114 may retrieve the requested port status from system database 110 that a daemon had previously populated. Command handler 114 may interact indirectly with daemons 112 to cause the daemons to react to state changes, for example, by writing state information to system database 110 to which the daemons can react. Command handler 114 may execute system commands to interact with daemons 112 instead of writing state information to system database 110.

Accordingly, a third party can use definition file 116 to extend an existing CLI. Definition file 116 may use a format that is different from the format used by an internal interface to develop the existing CLI. Configuration agent 102 can separate the internal interface used by the developer and the external interface used by a third party to extend the CLI. The format of definition file 116 is simplified to allow a user to include vendor, modes, daemons, and commands that should be used to extend the CLI. Then, configuration engine 102 may translate the information in definition file 116 into an extension to the CLI. The processing of definition file 116 improves the operation of the CLI by allowing the third party to extend the CLI, without having to expose the internal interface and the internal definition data.

System

Figure 12:
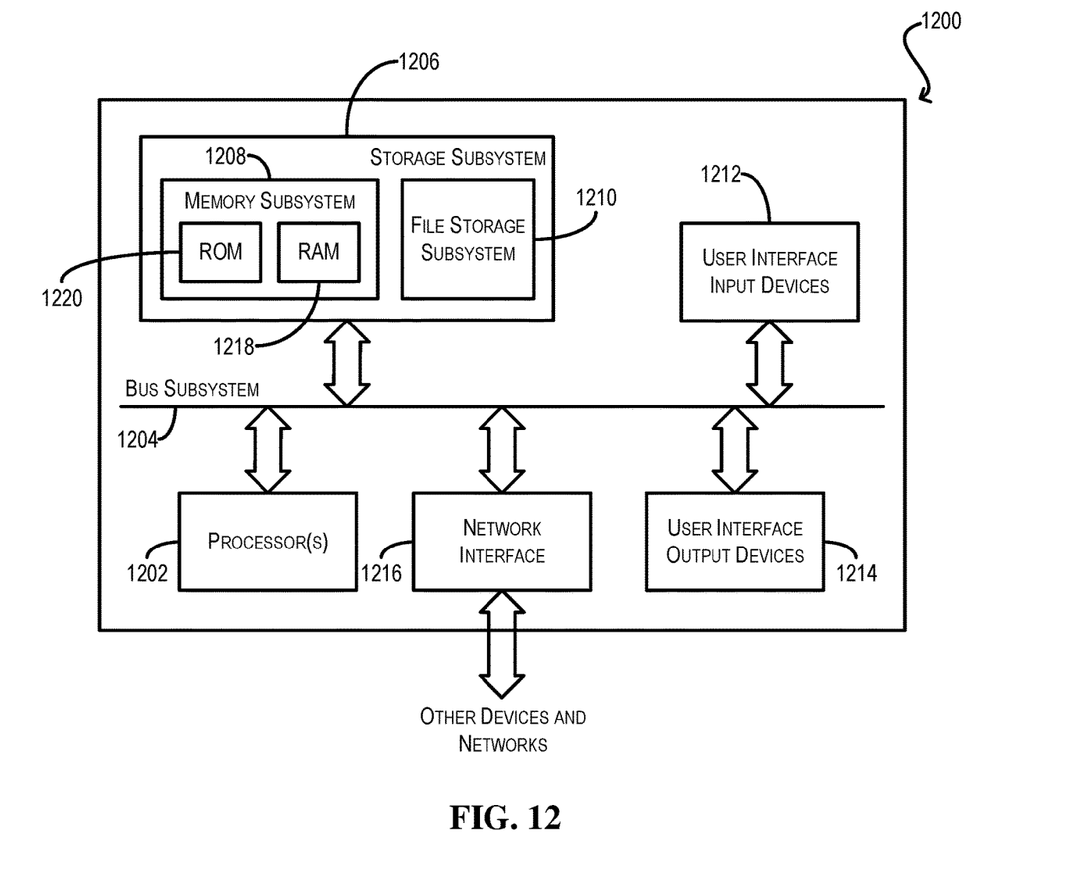
FIG. 12 depicts an example computer system according to some embodiments.

FIG. 12 depicts an example computer system 1200 according to some embodiments. Computer system 1200 can be used to implement any of the computing devices, systems, or servers described in the foregoing disclosure. As shown in FIG. 12, computer system 1200 includes one or more processors 1202 that communicate with a number of peripheral devices via a bus subsystem 1204. These peripheral devices include a storage subsystem 1206 (comprising a memory subsystem 1208 and a file storage subsystem 1210), user interface input devices 1212, user interface output devices 1214, and a network interface subsystem 1216.

Bus subsystem 1204 can provide a mechanism for letting the various components and subsystems of computer system 1200 communicate with each other as intended. Although bus subsystem 1204 is shown schematically as a single bus, alternative embodiments of the bus subsystem can utilize multiple buses.

Network interface subsystem 1216 can serve as an interface for communicating data between computer system 1200 and other computer systems or networks. Embodiments of network interface subsystem 1216 can include, e.g., an Ethernet card, a Wi-Fi and/or cellular adapter, a modem (telephone, satellite, cable, ISDN, etc.), digital subscriber line (DSL) units, and/or the like.

User interface input devices 1212 can include a keyboard, pointing devices (e.g., mouse, trackball, touchpad, etc.), a touch-screen incorporated into a display, audio input devices (e.g., voice recognition systems, microphones, etc.) and other types of input devices. In general, use of the term "input device" is intended to include all possible types of devices and mechanisms for inputting information into computer system 1200.

User interface output devices 1214 can include a display subsystem, a printer, or non-visual displays such as audio output devices, etc. The display subsystem can be, e.g., a flat-panel device such as a liquid crystal display (LCD) or organic light-emitting diode (OLED) display. In general, use of the term "output device" is intended to include all possible types of devices and mechanisms for outputting information from computer system 1200.

Storage subsystem 1206 includes a memory subsystem 1208 and a file/disk storage subsystem 1210. Subsystems 1208 and 1210 represent non-transitory computer-readable storage media that can store program code and/or data that provide the functionality of embodiments of the present disclosure.

Memory subsystem 1208 includes a number of memories including a main random access memory (RAM) 1218 for storage of instructions and data during program execution and a read-only memory (ROM) 1220 in which fixed instructions are stored. File storage subsystem 1210 can provide persistent (i.e., non-volatile) storage for program and data files, and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that computer system 1200 is illustrative and many other configurations having more or fewer components than system 1200 are possible.

EXAMPLE EMBODIMENTS

In some embodiments, a method for processing a command line interface, the method comprising: parsing, by a computing device, a definition file for extending a command line interface (CLI) with an extension, wherein the definition file defines a command definition for an extension to the CLI; creating, by the computing device, a mode in a CLI data structure for the CLI, wherein the mode is a container for associated commands; creating, by the computing device, a command based on the command definition in the CLI data structure, wherein the command is associated with the mode; determining, by the computing device, whether the mode is associated with a daemon process; and when the mode is associated with the daemon process, associating, by the computing device, the daemon process with the mode, wherein: the CLI data structure allows the command to be executed when the mode is entered into using the CLI, and when the mode is associated with the daemon process, the daemon process is accessible when executing the command.

In some embodiments, a command handler definition defines a command handler that is associated with a command, and the command handler is installed to service the command based on the command handler definition.

In some embodiments, the method further comprising: parsing the definition file to determine a mode command for the mode; and associating the mode command with the mode, wherein the mode command is used to enter the mode.

In some embodiments, the command handler is configured to interact with configuration storage for the daemon process during execution of the command.

In some embodiments, the method further comprising: generating a parse tree that defines a structure to recognize an input and match the input to the command; and storing the parse tree in association with the mode.

In some embodiments, the method further comprising: parsing identification information from a party that submitted the definition file; and associating the identification information with the extension.

In some embodiments, the CLI is extended using an external interface that is different from an internal interface this is used to develop the CLI.

In some embodiments, a method or processing a command line interface, the method comprising: parsing, by a computing device, a definition file for extending a command line interface (CLI) with an extension, wherein the definition file is processed through an external interface that is different from an internal interface this is used to develop the CLI; translating, by the computing device, a definition from the definition file to an internal structure supported by the internal interface, wherein translated definition implements the extension in the CLI; and adding, by the computing device, the internal structure to a data structure for the CLI, wherein a command set of the CLI is extended to perform a command that is defined by the definition.

In some embodiments, the definition file includes information for a mode, and the mode is a container to store the command.

In some embodiments, the definition file includes information for a daemon process, and the daemon process is interacted with when performing the command.

In some embodiments, the definition file defines the command, and information to execute the command is included in the data structure for the CLI.

In some embodiments, the information to execute the command comprises a parse tree, and the parse tree represents a structure to recognize an input and match the input to the command.

In some embodiments, the parse tree is integrated into the data structure for the CLI with other parse trees for other commands.

In some embodiments, a command handler definition defines a command handler that is associated with the command, and the command handler is installed to service the command based on the command handler definition.

In some embodiments, a command handler definition defines a command handler, the command handler definition includes an association with the command, and associating the command with the command handler, wherein the command handler is configured to service the command when the command is executed.

In some embodiments, the definition file includes identification information from a party that submitted the definition file; and associating the identification information with the extension.

In some embodiments, the definition file includes a mode command to enter the mode, and reviewing the CLI to determine if the mode command conflicts with existing mode commands.

In some embodiments, the definition file includes a syntax for the command, and reviewing the CLI to determine if the syntax conflicts with an existing syntax.

In some embodiments, the definition file defines a configuration generator, wherein the configuration generator is configured to add a configuration store in a system database for the CLI.

In some embodiments, a non-transitory computer-readable storage medium having stored thereon computer executable instructions, which when executed by a computing device, cause the computing device to be operable for: parsing a definition file for extending a command line interface (CLI) with an extension, wherein the definition file is processed through an external interface that is different from an internal interface this is used to develop the CLI; translating a definition from the definition file to an internal structure supported by the internal interface, wherein translated definition implements the extension in the CLI; and adding the internal structure to a data structure for the CLI, wherein a command set of the CLI is extended to perform a command that is defined by the definition Some embodiments may be implemented in a non-transitory computer-readable storage medium for use by or in connection with the instruction execution system, apparatus, system, or machine. The computer-readable storage medium contains instructions for controlling a computer system to perform a method described by some embodiments. The computer system may include one or more computing devices. The instructions, when executed by one or more computer processors, may be configured to perform that which is described in some embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of some embodiments may be implemented. The above examples and embodiments should not be deemed to be the only embodiments, and are presented to illustrate the flexibility and advantages of some embodiments as defined by the following claims. Based on the above disclosure and the following claims, other arrangements, embodiments, implementations, and equivalents may be employed without departing from the scope hereof as defined by the claims.

What is claimed is:

1. A method for processing a command line interface, the method comprising:
    parsing, by a computing device, a definition file for extending a command line interface (CLI) with an extension, wherein the definition file defines a command definition for an extension to the CLI, wherein the CLI is extended by processing, the definition file using an external interface that is different from an internal interface used to develop the CLI;
    creating, by the computing device, a mode in a CLI data structure for the CLI, wherein the mode is a container for associated CLI commands;
    creating, by the computing device, a command based on the command definition in the CLI data structure, wherein the command is associated with the mode;
    determining, by the computing device, whether the mode is associated with a daemon process; and
    when the mode is associated with the daemon process, associating, by the computing device, the daemon process with the mode,
    wherein:
        the definition file is se crate from a command handler that includes command logic to execute the command,
        the CLI data structure allows the command to be executed when the mode is entered into the CLI, and
        when the mode is associated with the daemon process,
        the daemon process is accessible when executing the command.

2. The method of claim 1, wherein: a command handler definition defines the command handler that is associated with the command, and the command handler is installed to serve the command based on the command handler definition.

3. The method of claim 2, further comprising:
    parsing the definition file to determine a mode command for the mode; and
    associating the mode command with the mode, wherein the mode command is used to enter the mode.

4. The method of claim 2, wherein:
    the command handler is configured to interact with configuration storage for the daemon process during execution of the command.

5. The method of claim 1, further comprising:
    generating a parse tree that defines a structure to recognize an input and match the input to the command; and
    storing the parse tree in association with the mode.

6. The method of claim 1, further comprising:
    parsing identification information from a party that submitted the definition file; and
    associating the identification information with the extension.

7. A method for processing a command line interface, the method comprising:
    parsing, by a computing device, a definition file for extending a command line interface (CLI) with an extension, wherein the definition file is processed through an external interface that is different from an internal interface used to develop the CLI;
    translating, by the computing device, a definition from the definition file to an internal structure supported by the internal interface, wherein translated definition implements the extension in the CLI; and adding, by the computing device, the internal structure to a data structure for the CLI, wherein a command set of the CLI is extended to perform a command that is defined by the definition and the definition file is separate from a command handler that includes command logic to execute the command.

8. The method of claim 7, wherein:
the definition file includes information for a mode, and the mode is a container to store the command.

9. The method of claim 7, wherein: the definition file includes information for a daemon process, and the daemon process is interacted with a command handler when performing the command.

10. The method of claim 7, wherein:
the definition file defines the command, and
information to execute the command is included in the data structure for the CLI.

11. The method of claim 10, wherein: the information to execute the command comprises a parse tree, and the parse tree represents a structure to recognize an input and match the input to the command.

12. The method of claim 11, wherein the parse tree is integrated into the data structure for the CLI with other parse trees for other commands.

13. The method of claim 7, wherein: a command handler definition defines the command handler that is associated with the command, and the command handler is installed to serve the command based on the command handler definition.

14. The method of claim 7, wherein: a command handler definition defines the command handler, the command handler definition includes an association with the command, and associating the command with the command handler, wherein the command handler is configured to serve the command when the command is executed.

15. The method of claim 7, wherein:
the definition file includes identification information from a party that submitted the definition file; and
associating the identification information with the extension.

16. The method of claim 8, wherein: the definition file includes a mode command to enter the mode, and reviewing the CLI to determine if the mode command conflicts with existing mode commands.

17. The method of claim 7, wherein:
the definition file includes a syntax for the command, and reviewing the CLI to determine if the syntax conflicts with an existing syntax.

18. The method of claim 7, wherein:
the definition file defines a configuration generator, wherein the configuration generator is configured to add a configuration store in a system database for the CLI.

19. A non-transitory computer-readable storage medium having stored thereon computer executable instructions, which when executed by a computing device, cause the computing device to perform steps of:
parsing a definition file for extending a command line interface (CLI) with an extension, wherein the definition file is processed through an external interface that is different from an internal interface used to develop the CLI;
translating a definition from the definition file to an internal structure supported by the internal interface, wherein translated definition implements the extension in the CLI; and
adding the internal structure to a data structure for the CLI, wherein a command set of the CLI is extended to perform a command that is defined by the definition and the definition file is se crate from a command handler that includes command logic to execute the command.

* * * * *